(12) United States Patent
Pan

(10) Patent No.: US 8,340,707 B2
(45) Date of Patent: Dec. 25, 2012

(54) METHOD AND SYSTEM FOR CONNECTING WIRELESS COMMUNICATIONS UNIT USERS

(76) Inventor: Sejo Pan, Atlantic Highlands, NJ (US)

( * ) Notice: Subject to any disclaimer, the term of this patent is extended or adjusted under 35 U.S.C. 154(b) by 0 days.

(21) Appl. No.: 13/083,567

(22) Filed: Apr. 10, 2011

(65) Prior Publication Data

US 2011/0207406 A1    Aug. 25, 2011

Related U.S. Application Data

(62) Division of application No. 11/696,728, filed on Apr. 5, 2007, now Pat. No. 7,949,359.

(51) Int. Cl.
*H04B 7/00* (2006.01)
*H04Q 7/20* (2006.01)

(52) U.S. Cl. ............ 455/518; 455/418; 455/456.3

(58) Field of Classification Search ............ 455/41.2, 455/41.3, 418–420, 456.1, 456.3, 518, 519, 455/550.1
See application file for complete search history.

(56) References Cited

U.S. PATENT DOCUMENTS

| | | | |
|---|---|---|---|
| 5,086,394 A | 2/1992 | Shapira | |
| 6,020,810 A | 2/2000 | Har-Even | |
| 6,246,376 B1 | 6/2001 | Bork et al. | |
| 6,542,749 B2 | 4/2003 | Tanaka et al. | |
| 6,542,750 B2 | 4/2003 | Hendrey et al. | |
| 6,681,108 B1 | 1/2004 | Terry et al. | |
| 7,418,268 B1* | 8/2008 | Cabano et al. | 455/518 |
| 2002/0111173 A1 | 8/2002 | Hendrey | |
| 2003/0020623 A1 | 1/2003 | Cao et al. | |
| 2004/0162064 A1 | 8/2004 | Himmelstein | |
| 2005/0038876 A1 | 2/2005 | Chaudhuri | |
| 2005/0113115 A1* | 5/2005 | Haberman et al. | 455/456.3 |
| 2005/0210387 A1 | 9/2005 | Alagappan | |
| 2006/0046709 A1* | 3/2006 | Krumm et al. | 455/422.1 |
| 2006/0085419 A1 | 4/2006 | Rosen | |
| 2007/0069901 A1 | 3/2007 | Tuck et al. | |
| 2007/0118661 A1* | 5/2007 | Vishwanathan et al. | 709/227 |
| 2007/0159995 A1 | 7/2007 | Ledin et al. | |
| 2008/0051081 A1* | 2/2008 | Nelson | 455/432.3 |

FOREIGN PATENT DOCUMENTS

| | | | |
|---|---|---|---|
| KR | 1020020037800 A | 5/2002 | |
| KR | 100680493 B1 | 2/2007 | |

OTHER PUBLICATIONS

Weilenmann et al; "Hummingbirds Go Skiing: Using Wearable Computers to Support Social Interaction"; 3rd International Symposium on Wearable Computers; Oct. 1999 pp. 191-192.

CNN.COM, "Japan's Lonely Hearts find each other with Lovegety", Jun. 7, 1998.

Nokia Corp.; "Nokia Sensor"; Software product information page of Nokia Sensor on http://nds2.nokia-asia.nokia.com/A4416020 as of Aug. 31, 2008.

Dahlberg et al; "Supporting opportunistic communication in mobile settings";Conference on Human Factors in Computing Systems, year 2000; ISBN:1-58113-248-4; pp. 111-112.

(Continued)

*Primary Examiner* — Nhan Le
(74) *Attorney, Agent, or Firm* — IPR Works, LLC

(57) ABSTRACT

A system and method for wireless communications unit users within proximity to make social connections. Users can dynamically discover potential matches in the proximity and interactively find out mutual intentions to socially connect in an anonymous and discreet manner.

20 Claims, 3 Drawing Sheets

11

12

OTHER PUBLICATIONS

Cederlund et al; "KompisKompassen"; Dept. of Informatics, Göteborg University, Sweden; ISSN 1651-4769; 2003. Concise Explanation in English on p. 5 of the attached document.

MOBILUCK.com; FAQ on Mobiluck on www.mobiluck.com as of Aug. 31, 2008.

Nathan Eagle. "Can Serendipity Be Planned?", MIT Sloan Management Review, vol. 46, No. 1, pp. 10-14, 2004.

* cited by examiner

METHOD AND SYSTEM FOR CONNECTING WIRELESS COMMUNICATIONS UNIT USERS

FIELD OF THE INVENTION

This invention relates generally to wireless communications usage. In particular, it relates to socially connecting wireless communications unit users within proximity.

BACKGROUND OF THE INVENTION

One of the most prominent questions of life is finding other people. People are constantly searching for a friend, a mate, or just someone for now. There have been a variety of matching services and systems ranging from traditional matchmaking agency, blind dating and personals, to all sorts of Internet based methods. The value of these mediums may be limited because of the judgment of the matchmaker, matching methods, false advertisement or lack of verifiability. In particular, these are all match-first, see-in-person-later methods. When the participants finally meet in person, the matching result is often not satisfactory.

Bars, clubs and other social environments such as parties or even daily encounters provide a see-first, inquire-intention-later model. The personal chemistry, or attraction, is the natural and often the most efficient matchmaker. However there is lack of information of the character and intention. Most importantly, many people are too shy to approach, too timid to make the first initiation, or too afraid of the possible rejection.

In today's world, people move around more often globally. Cities are more densely populated. Fleeting encounters and frequent social interactions are more abundant. Nonetheless, the barriers of social etiquettes, behavior restrictions, timing, or language skills still limit the possibilities of finding a match in person. "Is he? Is he not?", "Was she interested?", "How many Mr. Right have passed me by in the packed subways, in the daily walk to work, or in coffee shops?"

Therefore, what is desired for solving this problem is not so much a way to match for people, but more of the other way around—letting people find out by themselves about their mutual intentions after they see each other, using methods that are anonymous, interactive and yet socially suitable.

SUMMARY OF THE INVENTION

The systems and methods of this invention provides a mechanism for wireless communications unit (WCU) users to discover and track possible matches among other WCU users in proximity, and a mechanism to anonymously and interactively link users with mutual intention.

DEFINITIONS

Wireless Communications Unit: A wireless communications transmitter and receiver. It could be either a stand-alone device specifically for wireless communications, like a cell phone, PDA, walkie-talkie or mobile computer, or an add-on part of other apparatus, like a wireless networking card for computers, or wireless communication chips meant to be embedded in other objects like a key chain or a watch or other body jewelry.

Predetermined Distance or Range: The distance or range limited either by the telecommunications protocol or radio waves used, or by the user's choice. For example Bluetooth™ class II has a 10 meter range limit, which is suitable for the in-sight people discovery. On the other hand, if the range of the wireless communications device is too large, the user can narrow it down by defining a range within which the user wants to explore for a match.

Anonymous: In this invention, anonymous means the wireless communications unit user or signal sender is not readily identifiable as such, although human behavior, situational constrains, or user interaction could make it eventually identifiable. It means "sufficiently" anonymous, instead of "absolutely" anonymous. If a participating user is only exposed to a degree that possible social awkwardness is acceptable to the user, it is anonymous.

Received Signal Strength Indicator (RSSI): RSSI means the intensity of the received signal independent of the radio wave or communications protocol used. RSSI may vary with both distance and direction.

Time of Flight (TOF): TOF means propagation delay of a signal between two points of interest. In this invention it is used to refer to any method of distance measurement based on propagation delay.

Getting Hot/Getting Cold Indicator (GH/GCI): GH/GCI means a real-time indicator showing whether the distance and/or orientation of the signal source is increasing or decreasing over time. It is used to convey the information that the source of the received signal is getting closer (getting hot) or getting farther (getting cold) in distance and/or orientation.

DETAILED DESCRIPTION OF THE INVENTION

Figure 1:
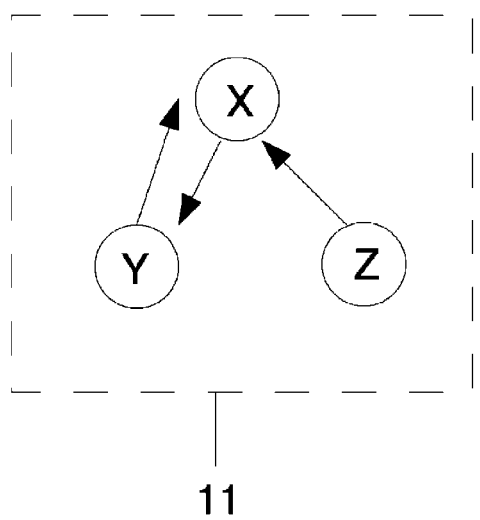
FIG. 1 illustrates two scenarios of three people signaling at the same time.
Figure 1:
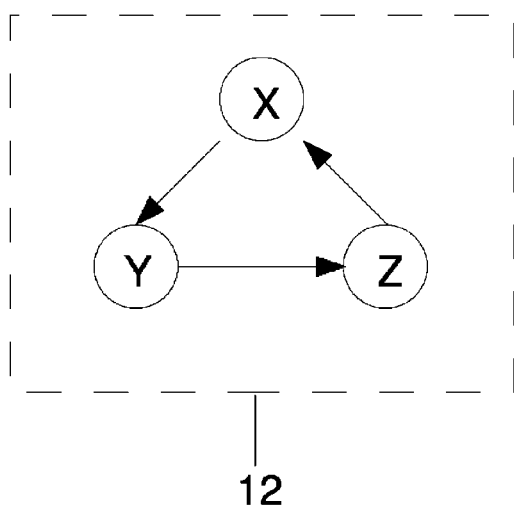

This invention provides unique ways for WCU users to make social connections with other WCU users in proximity With this invention, users can interactively and anonymously find out the intention of another person of interest. Users can also find and track possible matches in proximity Contrary to traditional methods, this invention is a "see-first-inquire-intention-later" approach to match-making.

The theme of the invention is to help WCU users find a match within other WCU users in proximity. When a person sees another person whom he is interested in, it is often difficult to find out the other person's interest or intention. Blunt words of inquiry or direct body language are possible ways, but they are crude and risk social embarrassment. In this invention, wireless signals are used as the medium of interest expression. The usage of wireless signaling could be inconspicuous and practically anonymous. The signal sender does not risk negative impacts if the signal is unanswered.

Suppose a simple wireless signal for this said purpose is defined. This signal doesn't carry any identification, and could be received by any other device that 'understands' the signal in proximity. In an environment of only two people, the presence of such a signal is enough to solve the matching problem. One person could send the signal in a discreet manner and try to receive the signal from the other person. If a signal is received, a mutual intention is concluded. If not, there is no embarrassment or awkwardness.

In an environment of more than two people, just detecting the presence of the signal is not enough. When you receive such a signal, it's not clear whether the signal is from the person in whom you are interested, or someone else. The distance and/or direction of the source of the received signal could contribute to resolve the ambiguity. A non-absolute 'distance/direction reference' could also be useful. If we change the relative position with the signal source, and repeatedly calculate the change of distance/direction or distance/direction reference over time, we have useful feedback of whether we are getting hotter (closer), or colder (farther), from the signal source.

It is well known that the received signal strength indicator (RSSI) decreases with distance. RSSI in this invention is not meant to be used for precise positioning, but a way to obtain a 'distance reference'. The change in distance reference over time is used to contribute to the GH/GCI. That is, if two WCU's are moving closer to one another, the received signal strength will increase over time, and vice versa. There could be noises resulting from reflections, obstacles, or other environmental factors, but since the roles in these interactions are humans, these noises are naturally not a practical hindrance. Controls of robots or mechanical mice might be trapped in errors like hitting the wall but people don't. Moreover, other distance measures could be used to compensate for the imperfection.

Time of Flight (TOF) is another method to obtain a distance reference of the signal source.

Distance information could also be obtained with the help of a source other than the participating WCU's. A WCU could obtain its own location from an external positioning service, like Global Positioning System (GPS), or from any implementation of an indoor positioning system, or from a telecommunications services provider. A WCU could encode its own location in the signal it sends out, and use the location information from the received signal to calculate the distance of the received signal source.

Localized methods like RSSI or TOF do not have to use other services and are more economical and independent. Distance information from GPS, or telecommunications service providers, or other positioning systems could be more absolute, but also depends on the resolution of the service. Each of the above mentioned methods can be used in lieu of another, or in combination with another, or as a calibration, in obtaining a distance or distance reference.

Directions of signal source could also be valuable information. In some aspect, signal source direction is already part of the RSSI in that, the more directly in line the receiving antenna is with the signal source, the stronger the RSSI is. The user could manually orient the WCU in difference directions and get feedback. There are other ways to obtain a direction reference of the received signal. For example the receiving antenna could automatically turn itself to search for the best direction that describes the signal source; or the system could have multiple receiving antennas for different directions. If the signal used is not omni-directional, same principles can be used to control the direction of the outgoing signal. Information obtained from external positioning services could be used to calculate the direction reference.

The above methods of obtaining distance reference and direction reference could be used, in weighted combination of any permutation to derive a combined reference of distance and direction. GH/GCI in this invention is defined to be the change of this combined reference over time. GH/GCI could be repeatedly conveyed to the user and give the user feedback whether he is getting closer in distance and/or direction to the received signal source in the interaction. GH/GCI could be conveyed to the user in a discreet way so that it's not observable by other people nearby.

As an example of the simplest scenario involving two people: you are alone in an elevator when one attractive person walks in. You want to know if the person is interested in you too. Social etiquette may prohibit you from directly looking at the person. You reach inside your pocket for the cell phone and start the signaling. If you don't receive any signal, no harm done, you walk away when arriving at your floor like nothing happened. If you do, the other person is also signaling you and the mutual intention is confirmed.

In the scenarios of three people X, Y and Z: If only one person X is signaling, X doesn't receive any response and there's no match. If two people are signaling: assuming X is signaling for Y (X is interested in Y and not Z) and gets a response, X then has to find out whether it's from Y or Z. By changing the relative distance between X and Y and checking the GH/GCI, X can further know if Y is signaling. If Y is not signaling, X turns the device off, no match. If Y is signaling, it remains for X to find out whether Y is signaling for X or for Z. On Y's part, if Y means to signal for Z, and Y sees that the change in distance between Y and X corresponds to the GH/GCI change, it is clear to Y that X is signaling, not the target Z, Y turns off the signal, end of the game. On the other hand, if Y means to signal X and not Z, then Y keeps signaling and eventually X and Y can converge to a conclusion 'safe' enough for both of them to start the first words.

For scenarios that all three people X, Y and Z are signaling, refer to FIG. 1. Scenario 11 shows the first possibility: X signals for Y, Y signals for X and Z signals for X. It is human nature that X and Y will tend to interact with each other more to find out mutual intention, and Z will try to interact with X only. On X's part, X could stop the signaling or direct the signal only at Y (if direction available) when X realizes Z is more in the proximity, or when X realizes Z's intention from the interaction. Not only does the interaction of X and Z leads nowhere, but X and Y also naturally tend to single themselves out from this environment to reduce the noise. The scenario eventually reduces to one of the above discussed scenarios. Scenario 12 shows the second possibility: X signals for Y, Y signals for Z, and Z signals for X. Under the same general behavior model, each of X, Y, Z stops when a non-target is in closer proximity, or when having more interaction with a non-target than the target. Eventually it results in no match at all.

Scenarios involving four or more people can be divided and reduced to one or more of the above mentioned scenarios. People could single themselves and/or the target out from environmental noises of other signals by repositioning themselves, thus reduce the scenario to the two-people example. It is also human nature to interact with the target person more and ignore non-targets. If cases where there is still ambiguity, people could stop signaling for a random amount of time before restart, similar to the collision detection and retransmission in some Media Access Control protocols used in computer networking. In situations of repeated encounters, the process does not necessarily need to converge right away—intentions could be built up and confirmed over time.

Multiple signals could be distinguished by, for example, signal encoding, communications protocol, or signal I.D. The WCU could track all the signals and each of their GH/GCI, along with the profile associated with each signal, if profile is used.

There are ways to reduce the search space and shorten the convergence time for this interactive process of matching. In some embodiments, users could manually reduce the effective sending and receiving range of the signal to limit the search space, for example, to the distance within sight, or to the size of the current room, or to the estimated distance of the user and the current match-target person. In some embodiments where the directional signal sending/receiving is used, the user can control the direction to send the signal and determine the orientation of the received signal source. This reduces the time to converge.

Some embodiments could have a user-defined profile, and profile-matching rules stored in the WCU. The profile could be encoded in the signal. If the profile of the received signal doesn't match that of the user, the user gets no "vibe" even if the sender is getting closer. This trims the possible search domain to that of the user's defined preference and eliminates some potential false alarms. In an even more open approach, the user could also choose to have a more descriptive profile of himself sent in the signal to be displayed at the receiving end, so that the receiving user can match the sender in sight with the characteristics described in the profile to expedite the matching process.

Compared with other match making methods which use a database or a centralized server for profile storing, profile matching, and user-matching, this invention prefers the embodiment of storing the user profile and matching rules locally and allowing user to alter them. Since the exchanges of profile information, including the communications handshakes of the WCU's, are also within the user's discretionary control without involving any service provider or leaving any trace in an external database, it has the advantage of being anonymous, independent and low-cost. However, an authentication method, for example, one similar to the certificate of web pages provided by a third party, could also be added to provide more creditability. The users could choose only to interact with other 'authenticated' users.

In some embodiments, users are able to select one or more of the other WCU's of interest and establish a communications channel, for example, by sending a message, to further expedite the matching process. The communication could carry more revealing information for visual matching, or lead to a branch-out process of isolated matching, for example "See you at the elevator by Exit Two".

In some embodiments where the sender can direct the antenna in a desired direction, or where the receiver can orient the antenna in a desired direction, the antenna can be implemented in a hidden fashion to be discreet, for example, in the earphone or in a eyeglass frame so that it follows the direction the user looks.

The GH/GCI information can be delivered to the user inconspicuously, for example, via the change of temperature of part of the WCU, or vibration, or screen display, or voice instruction through an earphone.

In some embodiments, to prevent foul play or ill-intended usage, the implementation could enforce that the receiver must also be sending and rule out the listen-only mode. Profile exchange could be limited to users with authenticated or registered profile through a third party service.

For a passive embodiment of this invention, the user may use the profile information to discover and track potential matches around him For example, you are sitting in a coffee shop. You can turn on your device to broadcast your profile and also 'sniff'. Your device discovers other devices within range with a matching profile, obtains a distance/direction reference and display the information to you. The sending/receiving continues as people around you move around, and the distance/direction reference of each matching WCU is updated and redisplayed. Matching the information with the movement of people in sight, you can locate potential matching targets and decide if you want to pursue further. As the next step, you can use the aforementioned interactive method to find out if a certain matching target has the same intention of matching with you, or you could choose one or more of the matching WCU's and establish communications.

In some group interaction embodiments, the invention can be used to track and locate a predefined group of WCU users. You are in a big shopping center with a group of friends, or family. Each of you can set your WCU to send to and receive from other group member's WCU. This could be done by agreeing on a particular predefined signal. You wander away and may lose sight of your friends in the crowds but your WCU enables you to 'sense' if they are nearby, getting closer or getting farther.

Figure 2:
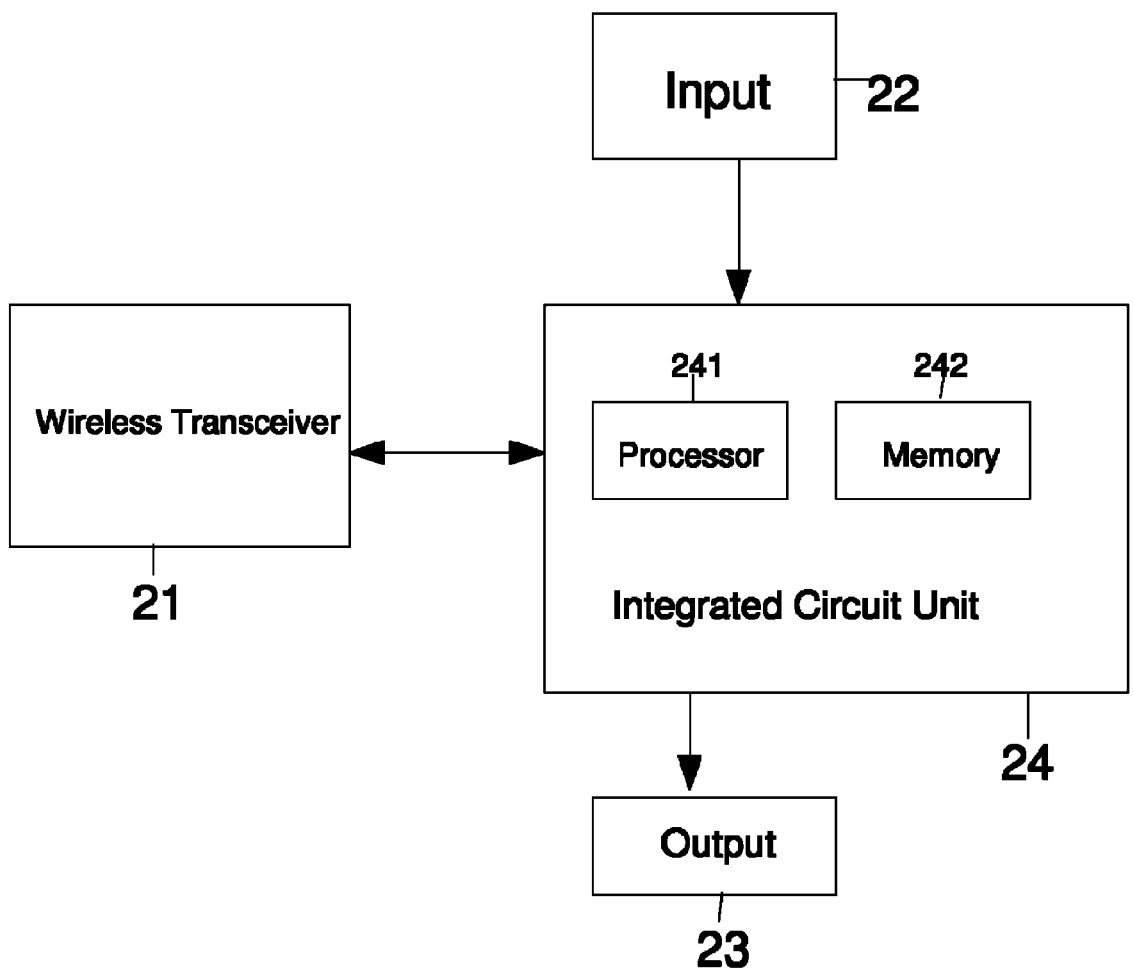
FIG. 2 shows an embodiment of the system with a wireless transceiver, an input interface, and output interface and an integrated circuit unit capable of calculating a distance/direction reference from the received signal.

FIG. 2 illustrates the basic system, which includes a wireless transceiver 21 capable of sending and receiving wireless signals; an input interface 22 for user input; an output interface 23 for conveying information to the user and an integrated circuit unit 24 connected to 21, 22, 23. The integrated circuit unit includes a processor 241 and memory 242. Processor readable instructions can be stored in the memory and executed by the processor. The integrated circuit unit could control the transceiver and obtain received signal information from the transceiver. The instructions in the memory can cause the system to use the received signal information to calculate a distance reference, and convey to the user via the output interface.

The integrated circuit unit could also control the transceiver in signal encoding/decoding.

Instructions in the memory could cause the system to calculate a distance reference using either RSSI or TOF, or both, or using one of them as a compensation of the other. The distance reference obtained from said calculation does not need to be the absolute distance.

In some embodiments, if a directional signal is used, a direction reference of the received signal could also be useful. The user can of course manually orient the antenna. The more the antenna is in line with the signal source, the stronger the RSSI is. The system could include a special antenna unit in the transceiver unit. This antenna unit could also be controlled by the integrated circuit unit. This antenna unit could include an electricity-driven device to turn the antenna in different directions to search the direction of the signal; or to send outgoing signal in a particular direction. Alternatively the special antenna unit can have multiple antennas pointed at different directions so the system can determine which direction best describes the source of the received signal.

Figure 3:
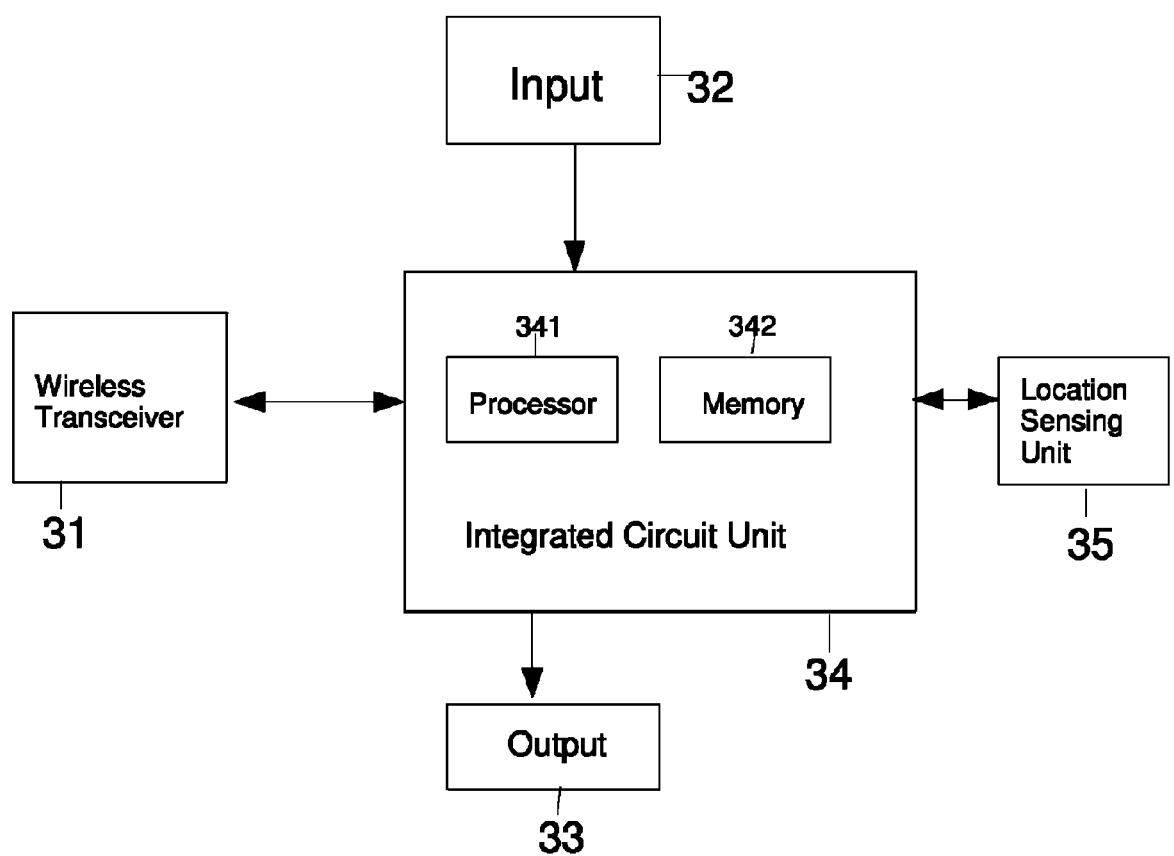
FIG. 3 shows an embodiment of the system with a wireless transceiver, an input interface, and output interface, a location sensing unit capable of obtaining location information of self from an external service, and an integrated circuit unit capable of calculating a distance/direction reference from either or both of the received signal and the location information obtained from the location sensing unit.

In some embodiments, the system could have another location sensing unit that is capable of obtaining the location of self, for example, from GPS, or from an indoor positioning system, or from a telecommunications service provider. FIG. 3 illustrates the system with the location sensing unit 35. The integrated circuit unit could encode the location information of self in the outgoing signal, extract location information from the received signal, and use the location information to obtain a distance reference and/or a direction reference of the received signal source.

Instructions stored in the memory could cause the system to remember the distance reference and/or direction reference of previous point of time, compare it with the current distance reference and/or direction reference, and convey the changes to the user via the output.

In some embodiments, the integrated circuit unit could take user input to change the effective communications range of the transceiver, for example, by decreasing or increasing the transmitting power, or changing the telecommunications protocol, or altering the instructions in the memory to discard distance references out of the user-specified range.

In some embodiments, a part of the memory could store a user profile, rules for profile usage, and rules for profile matching. Users could edit the profile or the profile rules via the input interface. The integrated circuit unit could encode the profile in the outgoing signal or extract the profile information from the received signal. Received profile could be compared with the local profile according to a set of user-editable profile matching rules in the memory.

Current technologies and products can already cover the components and functions of the system described, including various kinds of wireless communications devices, protocols, designs of input and output interface. It is easy for those skilled in the art to integrate a computing unit to provide the described functionality in this invention. It is also common knowledge to obtain and manipulate information such as signal strength, TOF, direction, location and distance. There could be numerous variations and permutations of the above described system that fall within the functional spirit and scope of the invention.

The invention claimed is:

1. A method for a first wireless communication unit (WCU) user to locate or connect with one or more other WCU users encountered in proximity, comprising:
storing a user-defined profile locally in the first WCU, wherein said profile comprises descriptive information of the user of the first WCU or an identifier based on which said descriptive information can be separately retrieved so that the user of the first WCU can be visually identified through said profile by other WCU users;
the first WCU handshaking with other WCU's by wirelessly transferring its profile to other WCU's and receiving profiles from other WCU's in proximity;
displaying to the user of the first WCU a discovery result comprising the received profiles of the WCU's in the proximity;
initiating a connection attempt from the first WCU to a second WCU with profile chosen by the user of the first WCU from among the discovery result.

2. The method of claim 1, further comprising:
repeatedly tracking WCU's being added to or removed from the proximity and repeatedly tracking any profile change of any WCU in the proximity and refreshing said discovery result displayed to the user of the first WCU.

3. The method of claim 2, further comprising:
allowing the user of the first WCU to discard or select any one or more of the profiles from said discovery result so that the discarded or not-selected profiles are removed from said discovery result afterwards.

4. The method of claim 1, further comprising:
allowing the user of the first WCU to communicate with the user of the second WCU by directly connecting the first WCU and the second WCU.

5. The method of claim 4, wherein the communication between any two WCU's uses at least one of the following to address each other: the device ID's of the WCU's, the ID's associated with software executing on the WCU's, and a part of the user-defined profile stored in the WCU's.

6. The method of claim 5, wherein the first WCU blocks incoming communications from all WCU users from reaching the user of the first WCU except from that of a user with whom the user of the first WCU is also trying to communicate.

7. The method of claim 1, further comprising:
connecting the user of the first WCU and the user of the second WCU by connecting the first WCU and the second WCU directly without going through any intermediate device, only when the user of the first WCU has initiated a connection attempt to the second WCU and the first WCU has received a connection attempt from the second WCU.

8. The method of claim 1, further comprising:
tracking another WCU user once encountered by retaining and using at least one of the following pieces of information of that other WCU obtained in the handshaking:
(a) the device ID of that other WCU;
(b) an ID associated with software executing on that other WCU;
(c) a part of, or the whole profile of that other WCU.

9. The method of claim 1, further comprising:
determining a distance and/or direction reference from each of the WCU's in said discovery result to the first WCU using at least one of the following: Received Signal Strength, Time of Flight, and External Positioning Service;
including said distance and/or direction references of each of the WCU's in said discovery result.

10. The method of claim 1, further comprising:
the first WCU notifying its user of an attempt to connect from another WCU only when its user makes a connection attempt to that other WCU and the first WCU also receives a connection attempt from that other WCU.

11. The method of claim 9, further comprising:
repeatedly determining said distance and/or direction reference and repeatedly updating the discovery result accordingly.

12. A wireless communication unit (WCU) for enabling its user to locate or connect with another WCU user encountered in proximity comprising:
a communicating device capable of transmitting and receiving wireless signals;
means for storing a user-defined profile locally in the WCU, wherein said profile comprises descriptive information of its user or an identifier based on which said descriptive information can be separately retrieved so that its user can be visually identified through said profile by other WCU users;
software executing on said WCU, said software when executed, causes handshaking of said WCU directly with other WCU's in proximity running the same software to exchange said profiles;
means for the WCU displaying a discovery result comprising the received profiles from other WCU's;
means for the WCU initiating a connection attempt to a target WCU chosen by the user of the WCU from among the discovery result.

13. The WCU of claim 12, further comprising means for discarding at least one received profile from said discovery result and exclude the corresponding WCU from future handshaking.

14. The WCU of claim 12, further comprising means for communicating directly between said WCU and another WCU using one of the following to address each other:
(a) the device ID's of the WCU's;
(b) an ID associated with software executing on each of the WCU's;
(c) any unique user-defined attribute in the profile of each of the WCU's.

15. The WCU of claim 12, further comprising means for the WCU connecting directly with said target WCU only when the WCU has initiated a connection attempt to said target WCU and has received a connection attempt from said target WCU.

16. The WCU of claim 12, further comprising means for tracking another WCU user once encountered by retaining and using at least one of the following pieces of information of that other WCU obtained in said handshaking:
   (a) the device ID of that other WCU;
   (b) an ID associated with software executing on that other WCU;
   (c) any part or all of the profile of that other WCU.

17. The WCU of claim 12, further comprising means for obtaining and displaying in the discovery result a reference of distance and/or direction from said WCU to another WCU.

18. The WCU of claim 17, further comprising means for repeatedly obtaining said reference of distance and/or direction and repeatedly updating the discovery result accordingly.

19. The WCU of claim 12, further comprising means for controlling the effective transmitting and receiving range of said communicating device.

20. The WCU of claim 12, further comprising means for said WCU blocking incoming communications from all other WCU's from reaching the user of said WCU except from one with whom the user of said WCU also attempts to communicate.

* * * * *